United States Patent
Mohtar et al.

(10) Patent No.: US 10,502,232 B2
(45) Date of Patent: Dec. 10, 2019

(54) TURBOCHARGER COMPRESSOR HAVING ADJUSTABLE TRIM MECHANISM INCLUDING SWIRL INDUCERS

(71) Applicant: Honeywell International Inc., Morris Plains, NJ (US)

(72) Inventors: Hani Mohtar, Chaumousey (FR); Stephane Pees, Ceintrey (FR); Alain Lombard, Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 106 days.

(21) Appl. No.: 15/909,899

(22) Filed: Mar. 1, 2018

(65) Prior Publication Data

US 2019/0271329 A1 Sep. 5, 2019

(51) Int. Cl.
*F04D 29/46* (2006.01)
*F04D 29/44* (2006.01)
*F02C 6/12* (2006.01)

(52) U.S. Cl.
CPC ............. *F04D 29/462* (2013.01); *F02C 6/12* (2013.01); *F04D 29/444* (2013.01); *F05D 2220/40* (2013.01)

(58) Field of Classification Search
None
See application file for complete search history.

(56) References Cited

U.S. PATENT DOCUMENTS

| 4,122,668 | A | * | 10/1978 | Chou | ............... F01D 21/006 60/792 |
| 4,927,325 | A | * | 5/1990 | Yano | ............... F01D 17/146 415/161 |
| 2005/0002782 | A1 | * | 1/2005 | Nikpour | ............ F04D 27/0246 415/208.1 |
| 2010/0263383 | A1 | * | 10/2010 | York | ............. F23R 3/14 60/748 |
| 2011/0079009 | A1 | * | 4/2011 | Kratschmer | ........... F01D 9/026 60/605.1 |
| 2012/0324859 | A1 | * | 12/2012 | Foster | ............... F02C 7/224 60/39.01 |

(Continued)

FOREIGN PATENT DOCUMENTS

| DE | 102008028298 A1 | 12/2009 |
| DE | 102010026176 A1 | 1/2012 |

(Continued)

*Primary Examiner* — Michael Lebentritt
(74) *Attorney, Agent, or Firm* — John C. James

(57) ABSTRACT

A centrifugal compressor for a turbocharger includes an inlet-adjustment mechanism operable to move between an open position and a closed position. The inlet-adjustment mechanism includes a plurality of blades disposed about the compressor air inlet and located within an annular space within the air inlet wall. The blades are pivotable about respective pivot points such that the blades extend radially inward from the annular space into the air inlet when the blades are in the closed position so as to form an orifice of reduced diameter relative to a nominal diameter of the inlet. Upstream surfaces of the blades include swirl inducers that are structured and arranged to impart either pre-swirl or counter-swirl to the air passing through the orifice into the compressor wheel.

8 Claims, 8 Drawing Sheets

(56) References Cited

U.S. PATENT DOCUMENTS

| | | | |
|---|---|---|---|
| 2014/0308110 A1* | 10/2014 | Houst | F02B 37/22 415/1 |
| 2015/0044026 A1* | 2/2015 | Kilkenny | F04D 7/02 415/72 |
| 2015/0192147 A1* | 7/2015 | An | F04D 29/4213 415/58.4 |
| 2016/0010466 A1* | 1/2016 | Lamson | F01D 5/187 60/772 |
| 2016/0201693 A1* | 7/2016 | An | F04D 29/4213 415/58.4 |
| 2016/0369631 A1* | 12/2016 | Johnson | F01D 5/081 |
| 2017/0191502 A1* | 7/2017 | Ozaki | F04D 17/10 |
| 2017/0292616 A1* | 10/2017 | Moens | F16K 3/03 |
| 2018/0230850 A1* | 8/2018 | Karstadt | F02B 37/24 |
| 2019/0078587 A1* | 3/2019 | Zeng | F04D 29/464 |

FOREIGN PATENT DOCUMENTS

| | | |
|---|---|---|
| DE | 102011121996 B4 | 6/2013 |
| DE | 102012011423 B3 | 11/2013 |
| DE | 102013003418 A1 | 8/2014 |
| GB | 957884 A | 5/1964 |
| JP | 3719337 B2 | 9/2005 |
| WO | 2013074503 A1 | 5/2013 |
| WO | 2016041024 A2 | 3/2016 |

* cited by examiner

TURBOCHARGER COMPRESSOR HAVING ADJUSTABLE TRIM MECHANISM INCLUDING SWIRL INDUCERS

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

Applicant's co-pending U.S. patent application Ser. No. 15/446,054 filed on Mar. 1, 2017, which claims the benefit of the filing date of Provisional Application No. 62/324,488 filed on Apr. 20, 2016, the entire disclosures of said applications being hereby incorporated herein by reference, describes mechanisms and methods for a centrifugal compressor that can enable the surge line for the compressor to selectively be shifted to the left (i.e., surge is delayed to a lower flow rate at a given pressure ratio). One embodiment described in said applications comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and pivotable radially inwardly and radially outwardly between an open position and a closed position, the inlet-adjustment mechanism comprising a plurality of blades disposed about the air inlet and each pivotable about one end of the blade, the blades pivoting radially inwardly through a slot in the air inlet wall when the blades are in the closed position so as to form an orifice of reduced diameter relative to a nominal diameter of the inlet.

Applicant is also the owner of additional applications directed to other inlet-adjustment mechanisms employing moving blades, including U.S. application Ser. No. 15/446,090 filed on Mar. 1, 2017, the entire disclosure of which is hereby incorporated herein by reference.

The present disclosure concerns inlet-adjustment mechanisms generally of the type described in the aforementioned '054, '488, and '090 applications, and particularly concerns modifications or redesigns of such mechanisms that aim to improve upon certain aspects of said mechanisms.

BRIEF SUMMARY OF THE DISCLOSURE

One such aspect of the aforementioned inlet-adjustment mechanisms for which improvement is sought concerns efficiency of the compressor at low engine speeds when the inlet-adjustment mechanism is closed.

In accordance with one embodiment disclosed herein, there is described a turbocharger having the following features:
- a turbine housing and a turbine wheel mounted in the turbine housing and connected to a rotatable shaft for rotation therewith, the turbine housing receiving exhaust gas and supplying the exhaust gas to the turbine wheel;
- a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel, the air inlet wall defining an annular space surrounding the air inlet and open to the air inlet at a radially inner end of the annular space; and
- a compressor inlet-adjustment mechanism disposed in the annular space of the air inlet wall and movable between an open position and a closed position, the inlet-adjustment mechanism comprising a plurality of blades disposed within the annular space, the blades collectively circumscribing an orifice, each blade having an upstream surface relatively farther from and facing away from the compressor wheel and a downstream surface relatively closer to and facing toward the compressor wheel, the blades pivoting about respective pivots radially inwardly from the annular space into the air inlet when the blades are in the closed position so as to cause the orifice to have a reduced diameter relative to a nominal diameter of the inlet;
- wherein the upstream surface of each of the blades includes a plurality of circumferentially spaced swirl inducers that are structured and arranged to impart swirl to the air passing through the orifice into the compressor wheel.

In one embodiment, the swirl inducers comprise slots or channels in the upstream surfaces of the blades. The slots can be oriented to impart either pre-swirl (swirl in the same direction as compressor wheel rotation) or counter-swirl.

In one embodiment of the invention, each blade includes a radially inner edge having a circular-arc shape, the blades being configured so that said radially inner edges collectively form the orifice as substantially circular in a selected position of the inlet-adjustment mechanism.

The selected position in which the radially inner edges of the blades form the orifice as substantially circular can be the closed position in some embodiments of the invention.

In one embodiment the inlet-adjustment mechanism comprises a pair of (i.e., upstream and downstream) annular end plates that are axially spaced apart and the blades are disposed between said end plates, such that the inlet-adjustment mechanism forms a "cartridge" installable in the compressor. The inlet-adjustment mechanism or cartridge is disposed in the annular space defined by the air inlet wall. The annular space can be defined between a main portion of the compressor housing and a separate inlet duct member that forms the majority of the air inlet to the compressor. The duct member is received into a receptacle defined in the main portion of the compressor housing.

The end plates can be spaced apart by a plurality of pins that pass through holes in the blades, and the blades can pivot about said pins.

Alternatively, the pins can be secured in the compressor housing such that separate end plates are not necessary (i.e., the inlet-adjustment mechanism is not a stand-along cartridge). For example, the function of one end plate can be served by an integral portion of the compressor housing, and the function of the other end plate can be served by an integral portion of the inlet duct member.

In accordance with one embodiment the inlet-adjustment mechanism further comprises a unison ring surrounding the blades, the unison ring being rotatable about a rotational axis of the turbocharger, wherein each of the blades is engaged with the unison ring such that rotation of the unison ring causes the blades to pivot about said pins. Each blade includes an end portion that engages a slot defined in an inner periphery of the unison ring.

The inlet-adjustment mechanism can further comprise a plurality of guides for guiding rotation of the unison ring. The guides can be secured to at least one of the end plates (or to the compressor housing and/or the inlet duct member in the case of a non-cartridge form of inlet-adjustment mechanism).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
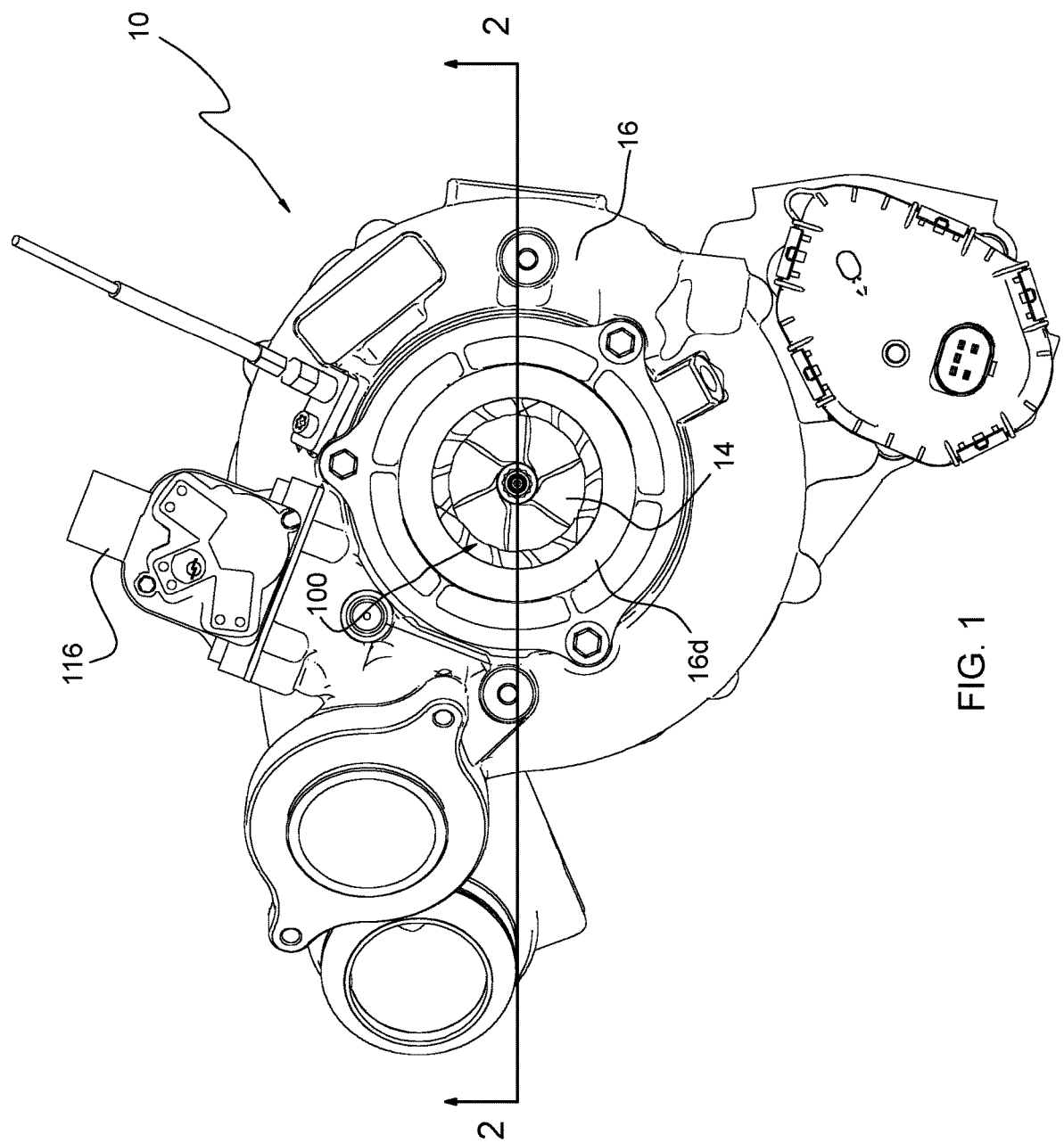
FIG. 1 is an end view of a turbocharger in accordance with one embodiment of the invention, looking axially from the compressor end toward the turbine end of the turbocharger.
Figure 3:
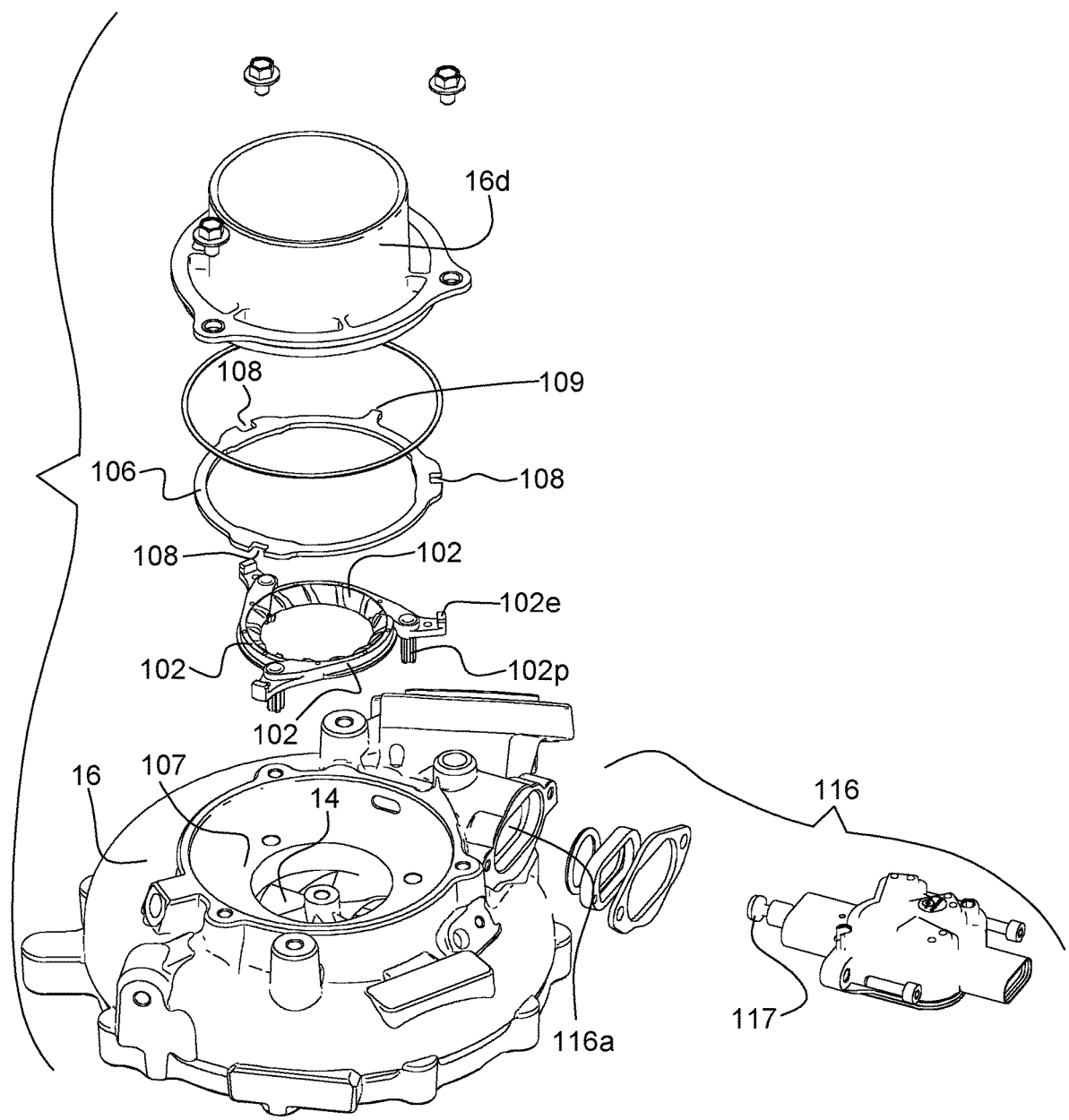
FIG. 3 is a partially exploded view of the compressor portion of the turbocharger of FIG. 1.
Figure 4:
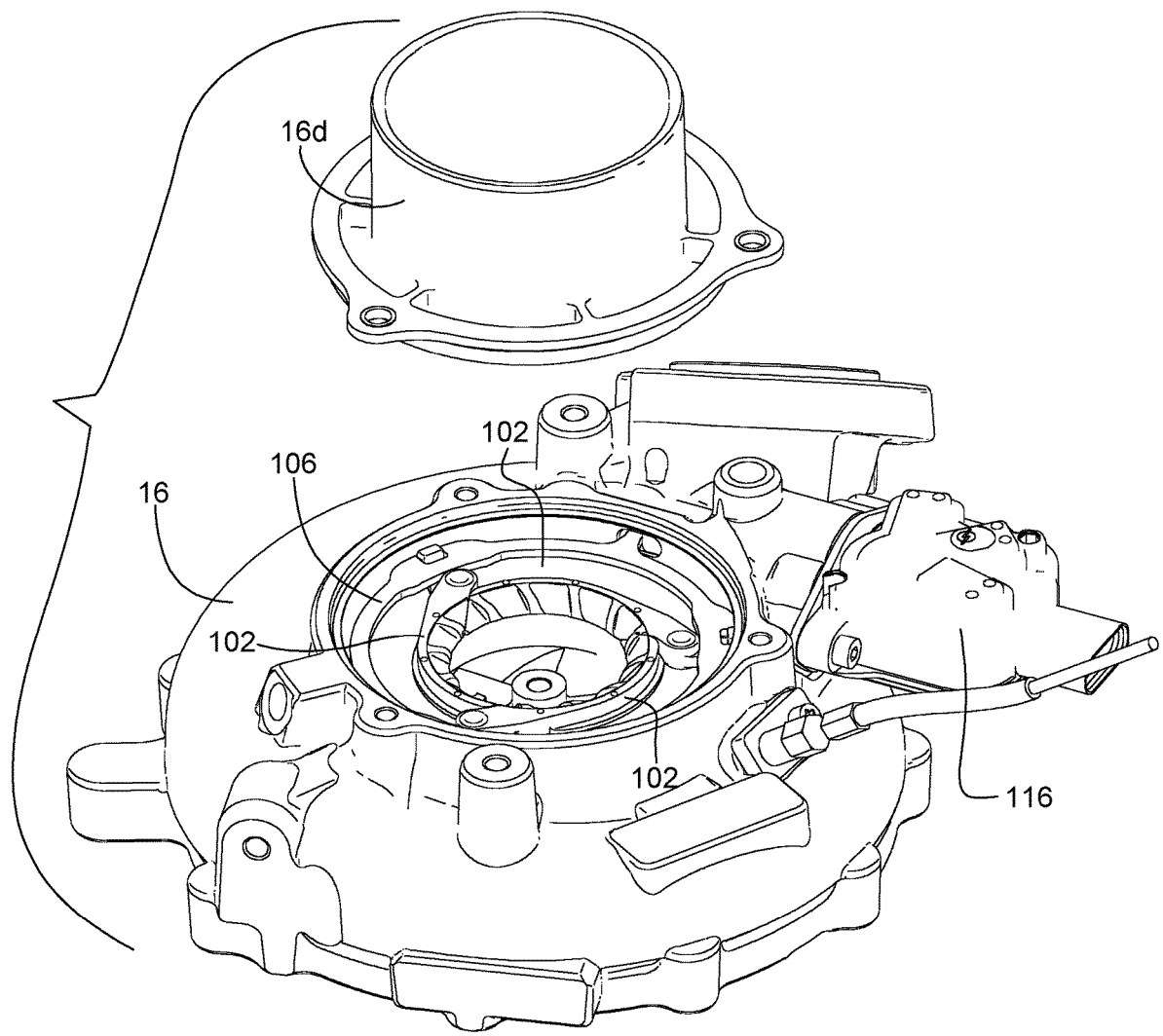
Figure 5:
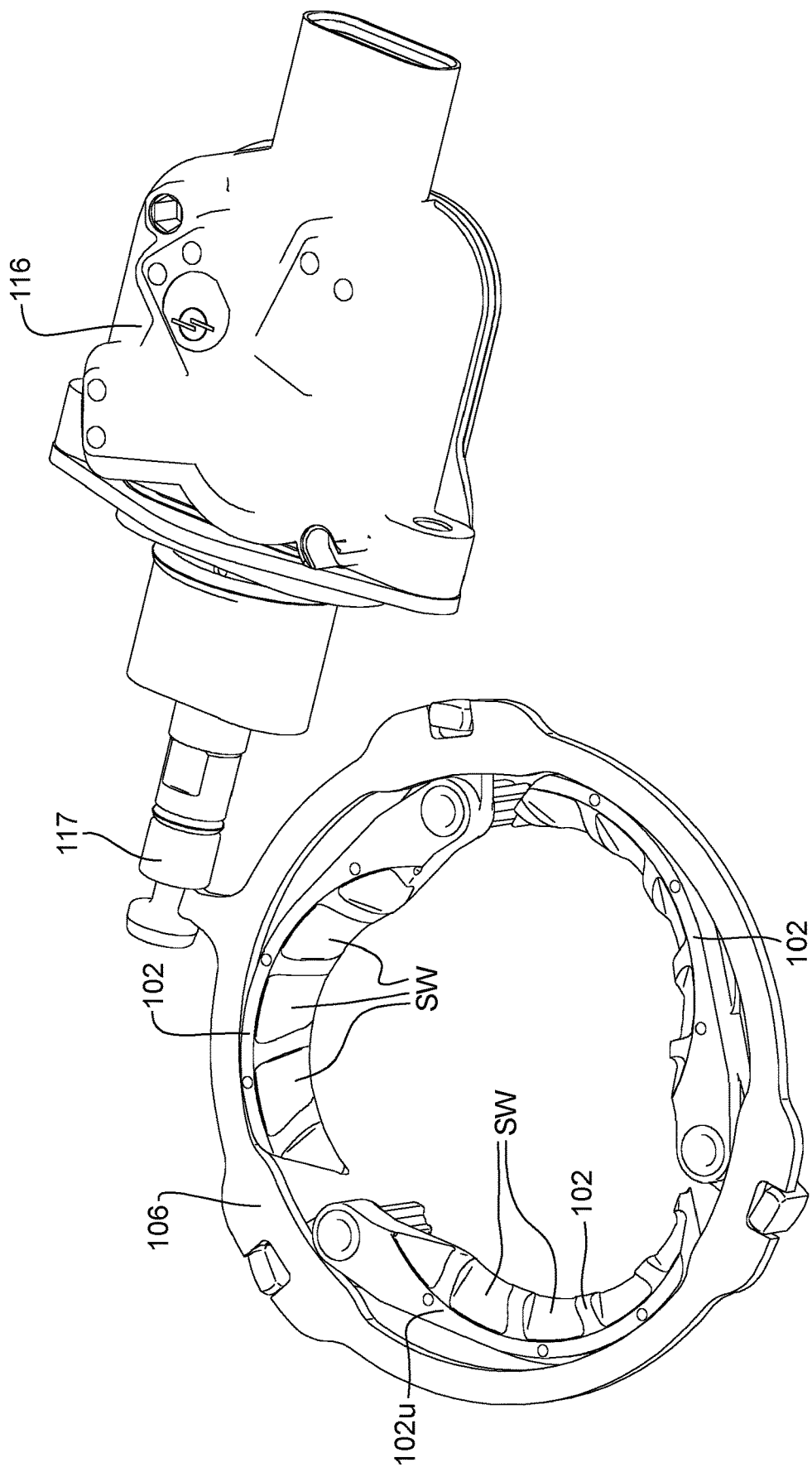
Figure 6:
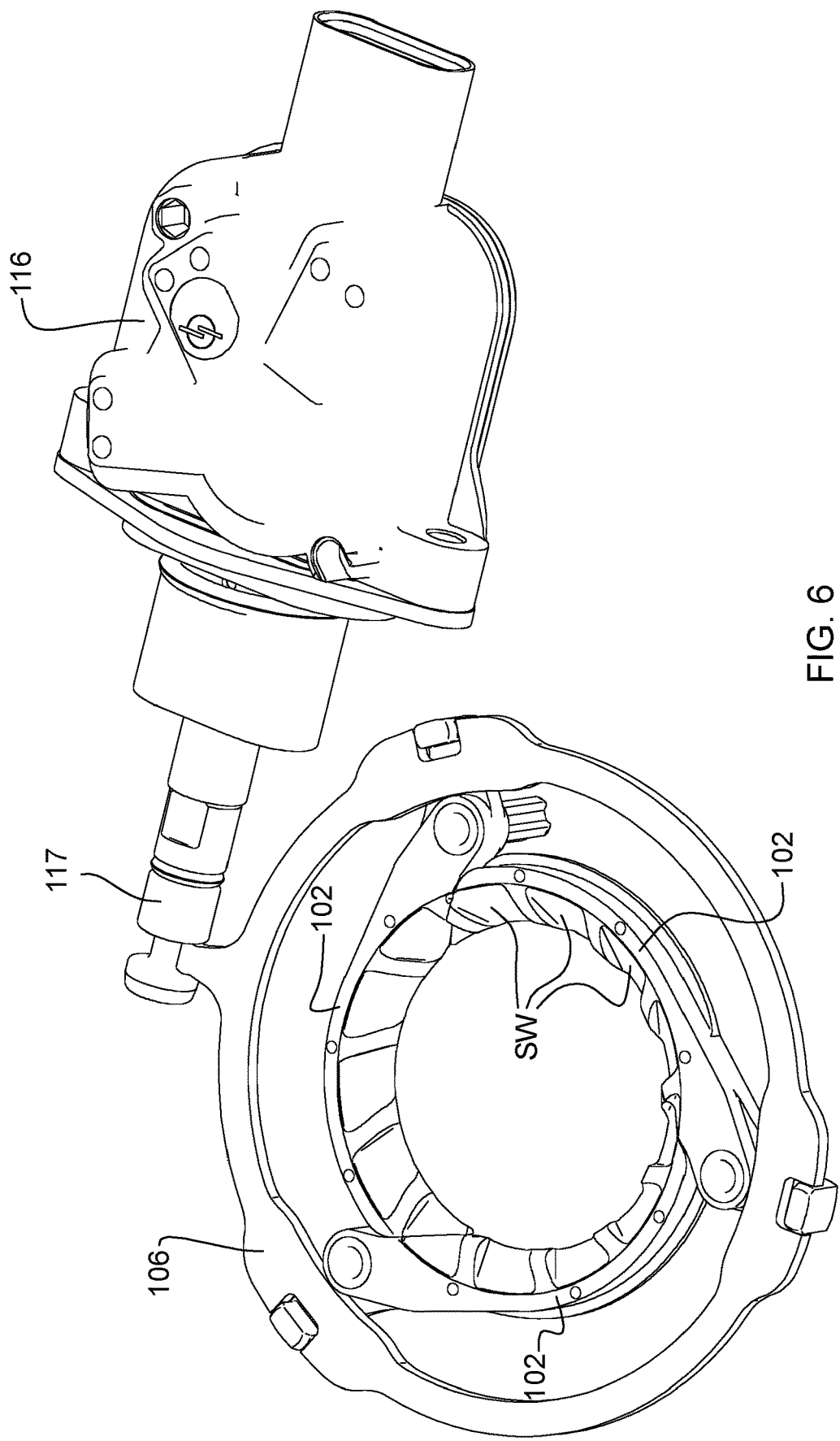
Figure 7:
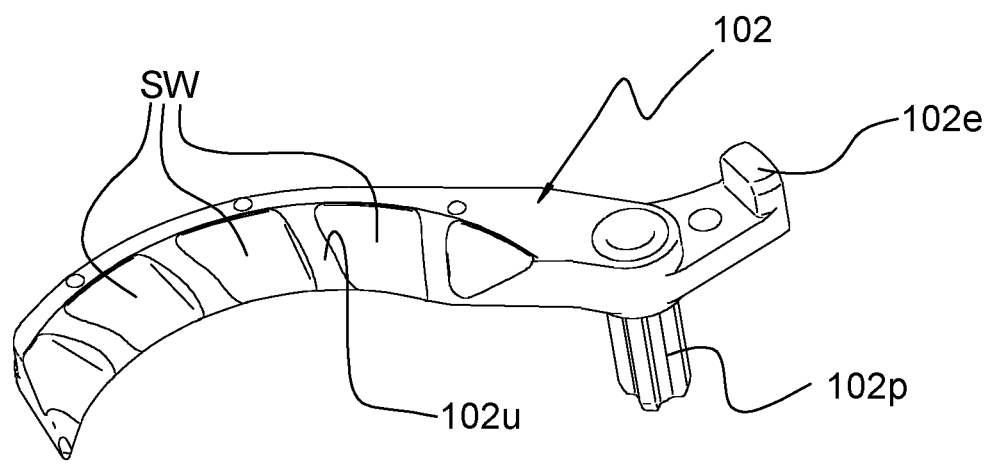
Figure 8:
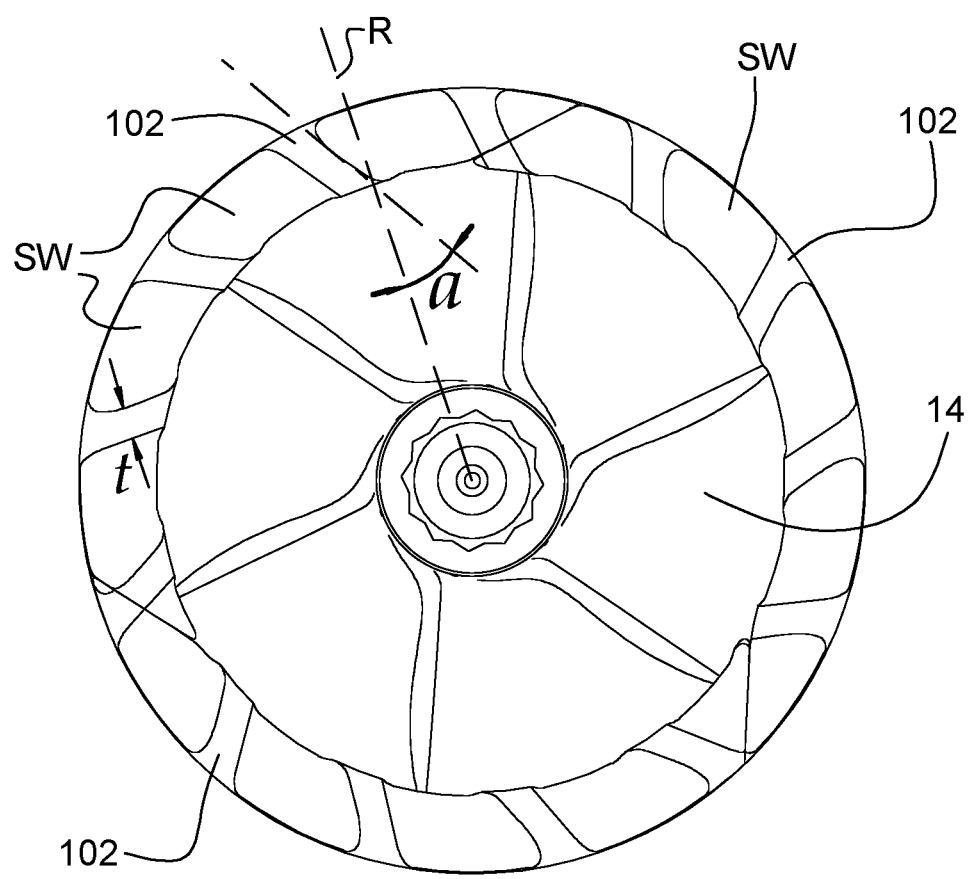
Figure 9:
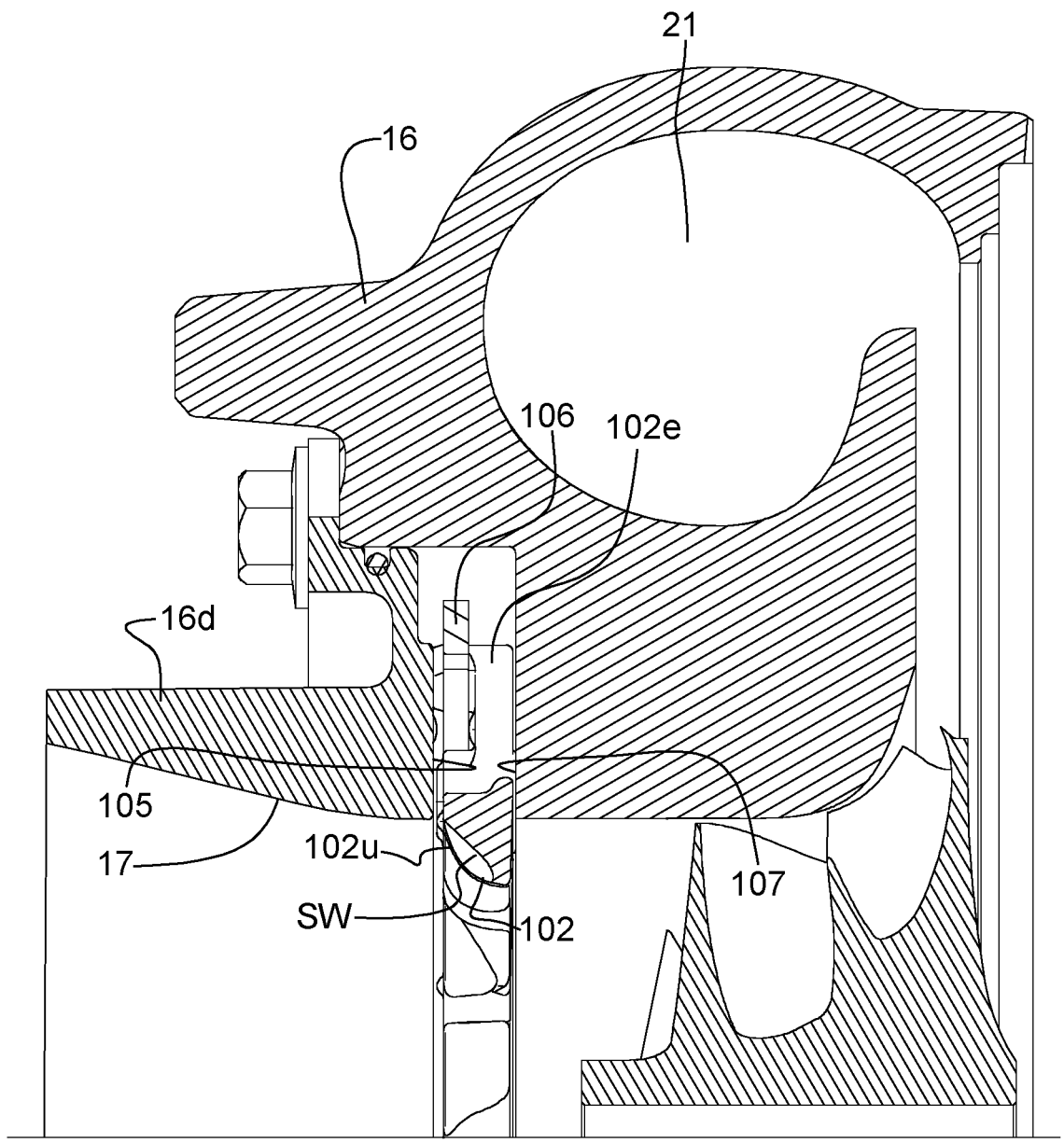

FIG. 4 an isometric view of the compressor housing assembly of FIG. 3, with the compressor cover (inlet duct member) exploded away so that the inlet-adjustment mechanism is visible;

FIG. 5 is an isometric view of a partial assembly of the inlet-adjustment mechanism and the actuator therefore, with the inlet-adjustment mechanism in an open position, as viewed from the upstream side of the mechanism;

FIG. 6 is a view similar to FIG. 5, with the inlet-adjustment mechanism in a closed position;

FIG. 7 is an isometric view of a blade of the inlet-adjustment mechanism, showing the upstream surface of the blade having swirl inducers;

FIG. 8 is an axial view of the compressor wheel and the blades of the inlet-adjustment mechanism, in the closed position of the mechanism, as viewed from upstream of the compressor, toward the turbine of the turbocharger; and FIG. 9 is a cross-sectional view through the compressor housing assembly and inlet-adjustment mechanism of the turbocharger of FIG. 1.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as pivoting "radially" inwardly or outwardly, the term "radially" does not preclude some non-radial component of movement of the blades (for example, the blades may occupy a plane that is angled slightly with respect to the rotational axis of the compressor, such that when the blades pivot radially inwardly and outwardly, they also move with a small axial component of motion; alternatively, the blades may pivot and translate, such as in a helical type motion).

Figure 2:
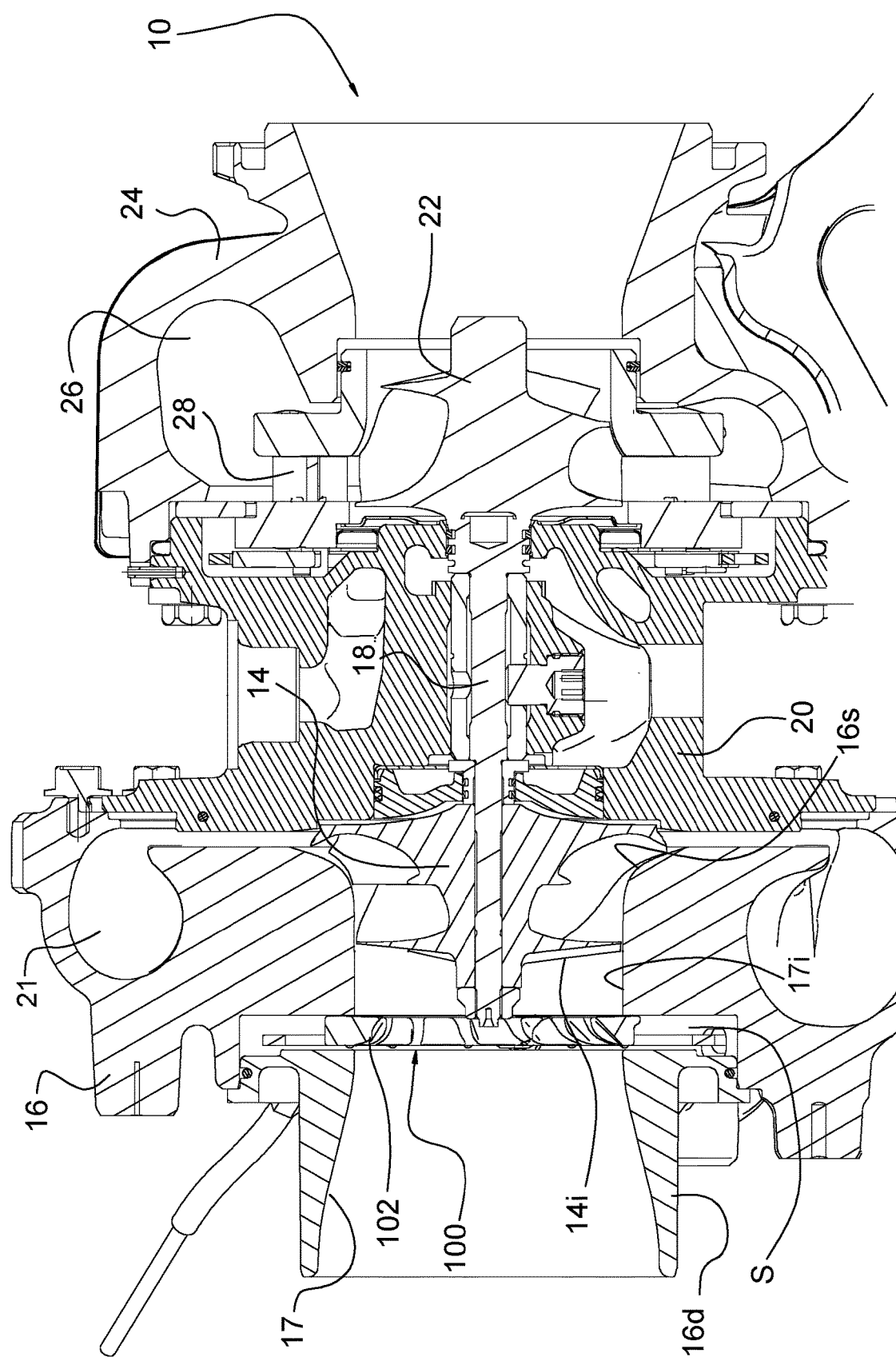
FIG. 2 is a cross-sectional view of the turbocharger along line 2-2 in FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

With reference to FIGS. 1-4, in the illustrated embodiment, the wall that defines the air inlet 17 is formed in part by the compressor housing 16 and in part by a separate cover or inlet duct member 16d that is received into a cylindrical receptacle defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16d. The annular space is bounded between an upstream wall surface 105 and a downstream wall surface 107. The inlet-adjustment mechanism is operable for adjusting an effective diameter of the air inlet into the compressor wheel. As such, the inlet-adjustment mechanism is movable between an open position and a closed position, and can be configured to be adjusted to various points intermediate between said positions.

With reference now to FIGS. 3-8, the inlet-adjustment mechanism comprises a plurality of blades 102 arranged about the central axis of the air inlet and each pivotable about a pivot pin 102p located at or near one end of the blade. In the illustrated embodiment, the pivot pins for the blades are journaled in bores in the downstream wall surface 107 of the compressor housing, such that the pivot pins can rotate in said bores. In this embodiment, the pivot pins are integral with and rigidly attached to the blades. The blades are arranged between the upstream wall surface 105 and the downstream wall surface 107, with a small amount of axial clearance or play for the blades between those wall surfaces, so that the blades can freely pivot without binding.

The inlet-adjustment mechanism further comprises a unison ring 106 for imparting pivotal movement to the blades. The unison ring surrounds the assembly of the blades 102 and is substantially coplanar with the blades, and is rotatable about an axis that coincides with the rotation axis of the compressor wheel. The unison ring includes a plurality of recesses 108 in its radially outer periphery, and each blade includes an end portion 102e that is engaged in a respective one of the recesses 108. Accordingly, rotation of the unison ring in one direction causes the blades 102 to pivot radially inwardly, and rotation of the unison ring in the other direction causes the blades to pivot radially outwardly. The assembly of the blades 102 and unison ring 106 is captively retained between the upstream wall surface 105 and the downstream wall surface 107.

The radially inner edges of the blades 102 include portions that preferably are generally circular arc-shaped and these edges collectively surround and bound a generally circular opening or orifice (although the degree of roundness varies depending on the positions of the blades, as further described below).

The range of pivotal movement of the blades is sufficient that the blades can be pivoted radially outwardly (by rotation of the unison ring in one direction, clockwise in FIG. 5) to an open position as shown in FIG. 5, in which the blades are entirely radially outward of the inner surface 17i (FIG. 2) of the inlet. As such, in the open position of the blades, the inlet-adjustment mechanism does not alter the nominal inlet diameter as defined by the inlet surface 17i.

The blades can also be pivoted radially inwardly (by rotation of the unison ring in the opposite direction, counterclockwise in FIG. 5) to a closed position as shown in FIG. 6. In the closed position, the circular-arc edges along the radially inner sides of the blades collectively form an orifice. In the illustrated embodiment the orifice is substantially a circle in the closed position, having a diameter that is less than that of the inlet surface 17i. ("Substantially a circle" in the present disclosure means that the circular-arc edges all lie on the same circle and collectively occupy at least 80% of the circumference of that circle.) This has the consequence that the effective diameter of the inlet is reduced relative to the nominal inlet diameter. Furthermore, in a non-illustrated embodiment the blades can be pivoted an additional amount to a super-closed position in which there is some degree of overlap of adjacent blades, which is made possible by forming the respective overlapping edge portions of adjacent blades as complementing or male-female shapes. When the blades are in the super-closed position, the circular-arc edges of the blades collectively define an opening or orifice that is not perfectly circular but is effectively even smaller than the opening for the closed position of FIG.

6. Thus, the inlet-adjustment mechanism causes the effective diameter of the inlet to be further reduced relative to the closed position. In this manner, the inlet-adjustment mechanism is able to regulate the effective diameter of the air inlet approaching the compressor wheel.

It should be noted, however, that it is not essential that the orifice defined by the inlet-adjustment mechanism be circular in the closed position. Alternatively, the orifice can be non-circular. The invention is not limited to any particular shape of the orifice.

As previously described, the blades 102 are actuated to pivot between their open and closed (and, optionally, super-closed) positions by the unison ring 106 that is rotatable about the center axis of the air inlet. Referring now to FIGS. 4-6, rotational motion is imparted to the unison ring by an actuator 116 that is received into a receptacle 116a (FIG. 3) defined in the compressor housing. The actuator includes an actuator rod 117 that extends through a space defined in the compressor housing and is affixed at its distal end to a protrusion 109 that projects radially outwardly from the outer periphery of the unison ring 106 (FIG. 3). The actuator is operable to extend and retract the rod 117 linearly along its length direction so as to rotate the unison ring 106 and thereby actuate the blades 102. Extending the rod pivots the blades towards the closed position and retracting the rod pivots the blades toward the open position.

As noted, the inlet-adjustment mechanism 100 enables adjustment of the effective size or diameter of the inlet into the compressor wheel 14. As illustrated in FIG. 2, when the inlet-adjustment mechanism is in the closed position, the effective diameter of the inlet into the compressor wheel is dictated by the inside diameter defined by the blades 102. In order for this effect to be achieved, the axial spacing distance between the blades and the compressor wheel must be as small as practicable, so that there is insufficient distance downstream of the blades for the flow to expand to the full diameter of the inducer portion of the compressor wheel 14 by the time the air encounters it. The inlet diameter is thereby effectively reduced to a value that is dictated by the blades.

At low flow rates (e.g., low engine speeds), the inlet-adjustment mechanism 100 can be placed in the closed position of FIGS. 2 and 6. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened as in FIG. 5. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

In accordance with one aspect of the invention disclosed herein, the inlet-adjustment mechanism 100 includes features for improving low-end performance of the compressor when the inlet-adjustment mechanism is closed. More particularly, each of the blades 102 of the mechanism includes swirl inducers SW on the upstream surface 102u of blade, as best seen in FIG. 7. The swirl inducers can comprise slots or channels in the upstream surface. With reference to FIG. 8, the slots or channels extend at angle a with respect to the radial direction (denoted by line R) of the compressor. The angle a can be either positive or negative, where a positive angle denotes pre-swirl (swirl in the same direction as the rotation of the compressor wheel 14, as shown in FIG. 8), and a negative angle denotes counter-swirl. The swirl inducers cause the air passing through the orifice of the mechanism to be turned from a flow direction having no circumferential component, to a flow direction that has some circumferential component.

The walls or ribs between adjacent swirl inducer slots have a thickness t as shown in FIG. 8. The number of slots SW, the thickness t of the ribs, and the angle a of the slots are design variable that can be selected when designing the blades of the inlet-adjustment mechanism.

The swirl inducers SW can be effective for improving low-end performance of the compressor when the inlet-adjustment mechanism is closed. For example, when the swirl inducers are angled to induce pre-swirl in the flow, incidence angles of the compressor blades can be reduced; this is beneficial particularly when the compressor is operating close to the surge line of the compressor map where incidence angles are high such that flow separation can begin to occur on the compressor blades, leading to less-efficient compressor operation. Pre-swirl reduces the incidence angles and thereby can improve efficiency.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs three blades 102, the invention is not limited to any particular number of blades. The invention can be practiced with as few as two blades, or as many as 12 blades or more. The number of blades can be selected as desired. Moreover, while blades with circular-arc edges have been illustrated and described, the blades do not have to have circular-arc edges. Blades with edges of different shapes (linear, elliptical, etc.) are also included within the scope of the invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel, the air inlet wall defining an annular space surrounding the air inlet and open to the air inlet at a radially inner end of the annular space; and
a compressor inlet-adjustment mechanism disposed in the annular space of the air inlet wall and movable between an open position and a closed position, the inlet-adjustment mechanism comprising a plurality of blades disposed within the annular space, the blades collectively circumscribing an orifice, each blade having an upstream surface relatively farther from and facing away from the compressor wheel and a downstream surface relatively closer to and facing toward the compressor wheel, the blades pivoting about respective pivots radially inwardly from the annular space into the air inlet when the blades are in the closed position so as to cause the orifice to have a reduced diameter relative to a nominal diameter of the inlet;

wherein the upstream surface of each of the blades includes a plurality of circumferentially spaced swirl inducers that are structured and arranged to impart swirl to the air passing through the orifice into the compressor wheel.

2. The turbocharger of claim 1, wherein the swirl inducers comprise slots in the upstream surface of each blade.

3. The turbocharger of claim 2, wherein the slots are oriented to impart pre-swirl to the air.

4. The turbocharger of claim 2, wherein the slots are oriented to impart counter-swirl to the air.

5. The turbocharger of claim 1, wherein the radially inner edge of each blade has a circular-arc shape, the blades being configured so that said radially inner edges collectively form the orifice as substantially circular in a selected position of the inlet-adjustment mechanism.

6. The turbocharger of claim 1, wherein the number of said blades is three.

7. The turbocharger of claim 1, wherein the inlet-adjustment mechanism further comprises a unison ring, the unison ring being rotatable about a rotational axis of the turbocharger, wherein each of the blades is engaged with the unison ring such that rotation of the unison ring causes the blades to pivot.

8. The turbocharger of claim 7, wherein each blade includes an end portion that engages an outer periphery of the unison ring.

* * * * *